Dec. 25, 1934.   P. VAN CLEEF   1,985,356
CUTTING APPARATUS
Filed Oct. 12, 1931   5 Sheets-Sheet 5

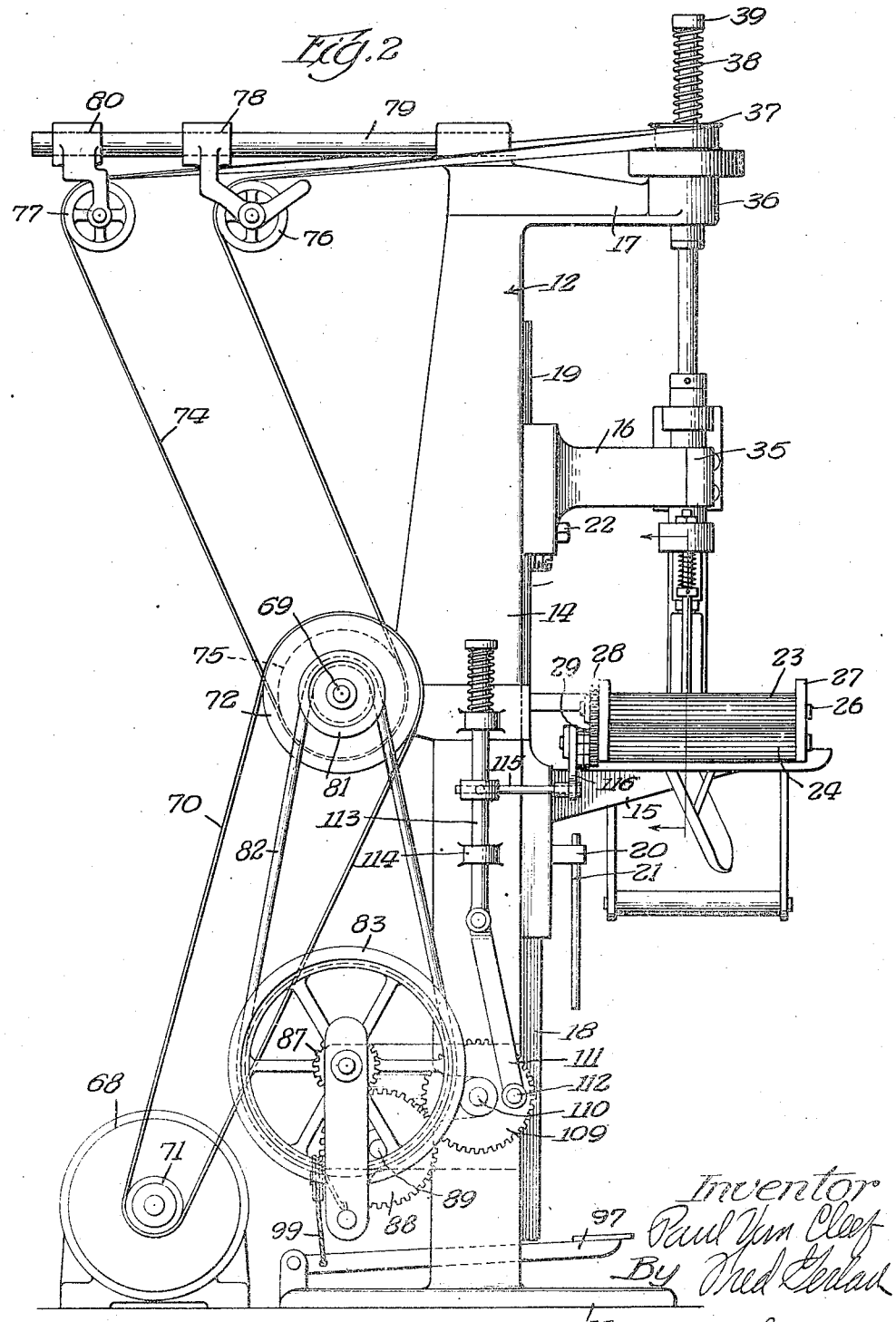

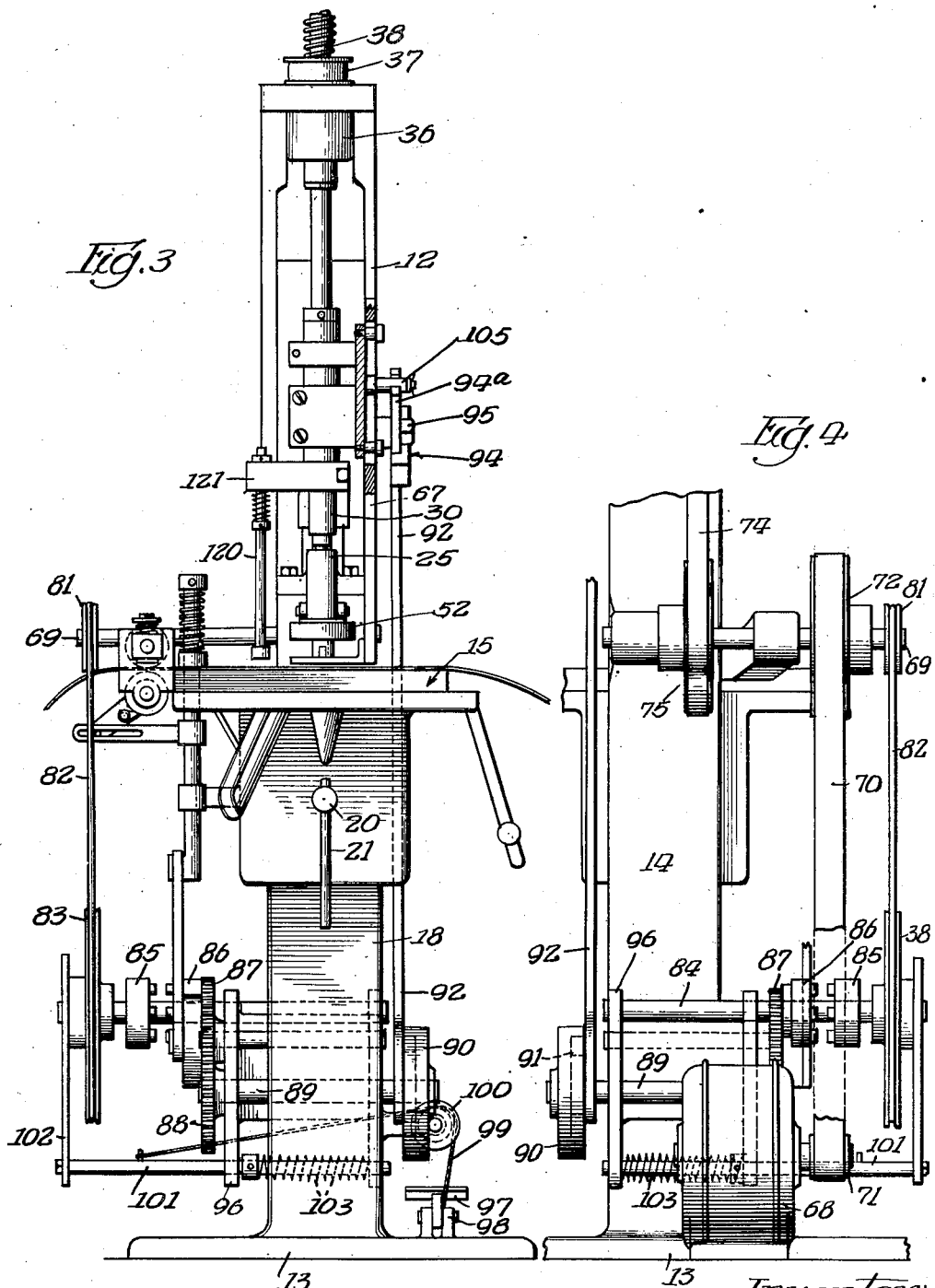

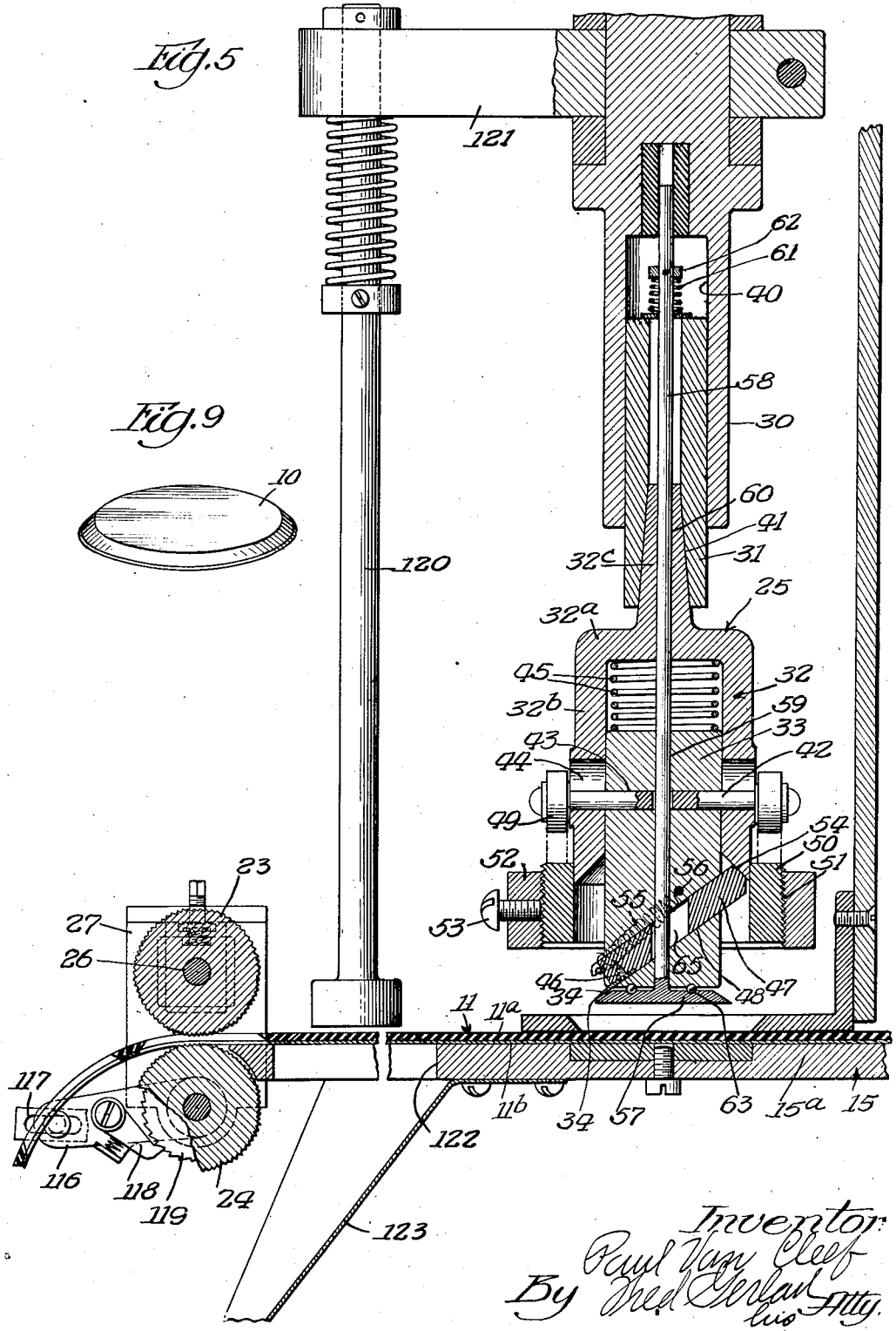

Inventor
Paul Van Cleef
By Fred Gerlach
his Atty.

Patented Dec. 25, 1934

1,985,356

UNITED STATES PATENT OFFICE 1,985,356

CUTTING APPARATUS

Paul Van Cleef, Chicago, Ill., assignor to Van Cleef Brothers, Chicago, Ill., a partnership composed of Noah Van Cleef, Felix Van Cleef, Maxime Van Cleef, and Paul Van Cleef Application October 12, 1931, Serial No. 568,234

15 Claims. (Cl. 164—71)

The invention relates generally to cutting apparatus. More particularly the invention relates to that type of apparatus which is designed to cut bevel-edged tire patches from a composite strip.

One object of the invention is to provide an apparatus of this type which comprises a rotary, blade-equipped cutting head and operates to cut truly circular, bevel-edged tire patches.

Another object of the invention is to provide a cutting apparatus of the last mentioned character in which the cutting head is positioned to rotate on a substantially vertical axis and the blade extends downwardly and outwardly from the head and, during rotation of the head, is fed progressively into the composite patch-forming strip so that it cuts the strip evenly and readily and forms smooth, bevelled edges on the patches.

Another object of the invention is the provision of simple and improved mechanism whereby the composite, patch-forming strip is held against distortion or buckling during operation of the rotary cutting head.

A further object of the invention is to provide a patch-cutting apparatus of the type under consideration which includes mechanism whereby the composite patch-forming strip is fed step-by-step or intermittently under the cutting head and the cutting head is shifted vertically so as to effect cutting of the strip during the intervals at which the strip is at rest.

A still further object of the invention is to provide an apparatus for cutting a bevel-edged tire patch which is generally of new and improved construction and may be produced at a low cost and operated rapidly, and in which facility of adjustment and accessibility of the various parts are combined with durability and compactness of construction.

Other objects of the invention and the various advantages and characteristics of the present construction will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Fig. 2 is a view of the other side of the apparatus;

Fig. 3 is a front view;

Fig. 4 is a fragmentary rear view;

Fig. 5 is a vertical section, illustrating in detail the construction and arrangement of the rotary cutting head;

Fig. 9 is a perspective of a tire patch of the type which the present apparatus is designed to cut.

Figure 1:
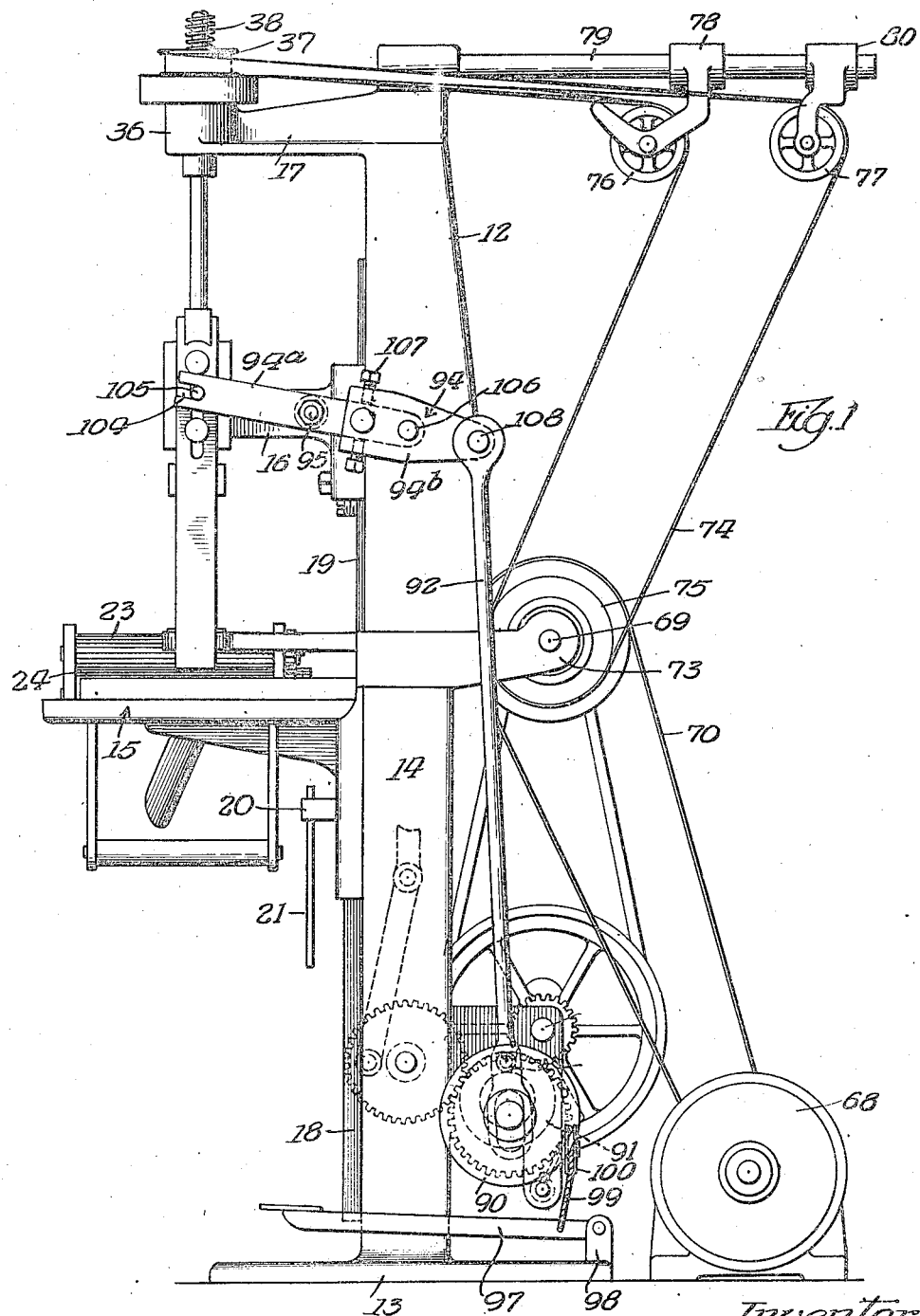
Fig. 1 is a view of one side of a patch-cutting apparatus embodying the invention.

The apparatus which forms the subject matter of the invention is designed to cut truly circular, bevel-edged tire patches 10 from a composite strip of patch-forming material. The strip is designated in the drawings by the numeral 11 and comprises an upper layer $11^a$ of cured rubber and a lower layer $11^b$ of uncured rubber. The lower layer is joined to the upper layer of cured rubber by cohesion and has fabric covering on the outer face thereof so that it is protected and cannot stick or adhere to articles with which it comes in contact. In using or applying the tire patches 10, the fabric cover is removed and the layer of uncured rubber is pressed against the portions of the tire or tube which are to be repaired, as well understood in the art.

The apparatus comprises a cast metal supporting structure 12. This structure consists of a rectangular base 13, a standard 14, a worktable 15 and a pair of arms 16 and 17. The standard 14 is formed integrally with and projects upwardly from the central portion of the base 13. The worktable 15 is vertically slidable on a guide 18 at the front of the standard and embodies a rectangular, horizontally extending portion $15^a$ which is located in front of the standard and is adapted to support the patch-forming strip 11 and to have the latter drawn intermittently or step-by-step longitudinally thereacross. The arm 16 is located directly above the rectangular portion $15^a$ of the worktable 15 and is slidable vertically on a guide 19 at the front of the standard 14. The arm 17 is formed integrally with and projects forwardly from the upper end of the standard 14 and is positioned so that it is aligned vertically with the arm 16. The worktable 15 is located in any desired adjusted position on the guide 18 by means of a clamp device 20 which is in the form of a bolt and has an arm 21 whereby it may be turned so as to release or tighten the table. A bolt 22 extends through the portion of the arm 16 that is mounted slidably on the guide 19 and is arranged to lock the arm releasably in place.

Figure 6:
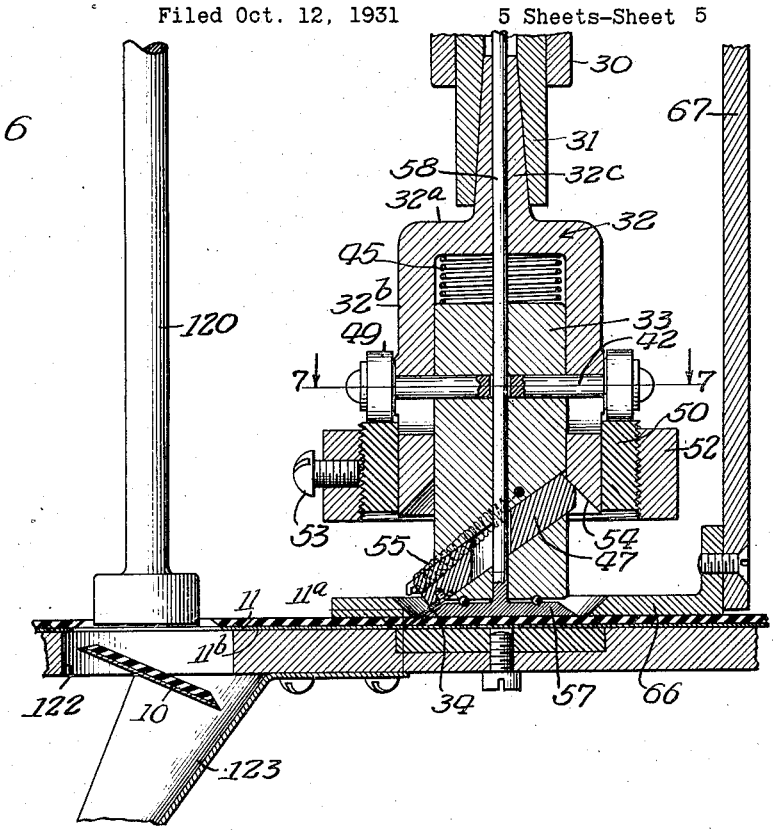
Fig. 6 is a section exhibiting the manner in which the blade is progressively fed into the composite strip for patch-cutting purposes.
Figure 7:
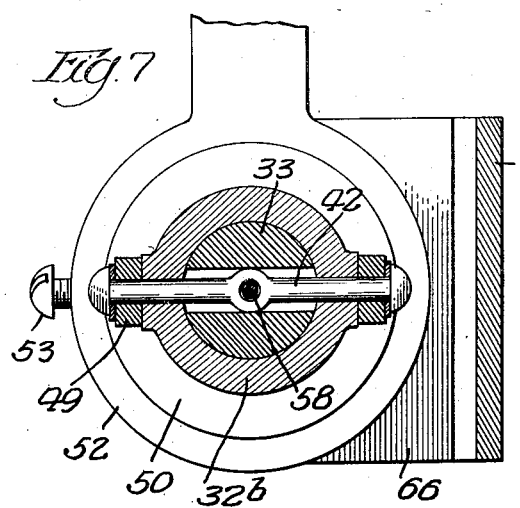
Fig. 7 is a horizontal section on the line 7—7 of Fig. 6.

In addition to the supporting structure 12, the apparatus comprises a pair of fluted feed rolls 23 and 24, and a rotary cutting head 25. The feed rolls 23 and 24 are located at one end of the rectangular portion 15a of the worktable 15 and are supported rotatably by means of shafts 26 which extend longitudinally therethrough and have the ends thereof journalled in bearing brackets 27. The latter are secured in any suitable manner to the worktable 15. The feed roll 23 is located directly above the feed roll 24 and is movable vertically. The patch-forming strip 11 extends between the rolls, as indicated in Figs. 3, 5 and 6 of the drawings. The rolls 23 and 24 are connected together for conjoint rotation in opposite directions by means of a pair of gears 28 and 29 and are operated as hereinafter described, so as to cause the strip 11 to be fed step-by-step or intermittently across the worktable 15. The gear 28 is secured fixedly to one end of the shaft for the roll 23 and meshes with the gear 29. The latter is secured fixedly to the shaft for the fluted feed roll 24.

Figure 8:
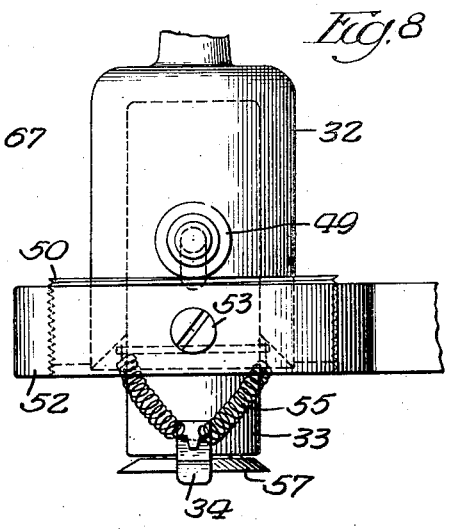
Fig. 8 is an elevation of the cutting head.

The rotary cutting head 25 is adapted, during the intervals at which the patch-forming strip is at rest on the work-supporting table 15, to cut the strip so as to form the patches 10. It is positioned over the central part of the rectangular portion 15a of the table 15 and embodies a spindle 30, a sleeve 31, a head member 32, a cylindrical plunger 33 and a blade 34. The spindle 30 extends vertically and has the lower end thereof journalled in a bearing 35 at the outer end of the arm 16. The upper end of the spindle is journalled in a bearing 36 and is associated with a pulley 37. The bearing 36 is located directly above the bearing 35 and is formed integrally with the outer end of the arm 17. The pulley 37 is connected by vertical splines (not shown) to the spindle and is driven, as hereinafter described, so as to drive the spindle and thus impart rotary movement to the cutting head. It rests loosely upon the bearing 36 at the outer end of the arm 17 and is forced downwardly against the bearing by a coil spring 38. The latter surrounds the upper end of the spindle 30 and abuts against a collar 39 at the extreme upper end of the spindle. By virtue of the fact that the pulley is connected to the spindle by vertically extending splines, the spindle may be moved vertically in order to bring the cutting head into and out of cutting relation with respect to the patch-forming strip, without affecting the driving connection. The sleeve 31 fits snugly in a bore 40 in the lower end of the spindle 30 and has a downwardly flared socket 41 in its lower end. The head member 32 is formed of cast metal and comprises a circular cross wall 32a, a cylindrical wall 32b and a tapered stem 32c. The stem is formed integrally with and projects upwardly from the cross wall 32a and fits frictionally in the downwardly flared socket 41 in the lower end of the sleeve 31. The cylindrical wall 32b is formed integrally with and depends from the marginal part of the cross wall 32a. The plunger 33 is mounted for vertical sliding movement within the cylindrical side wall of the head member 32 and is supported by means of a transverse shaft 42. The latter extends through a transverse opening 43 in the upper end of the plunger and is arranged so that the ends thereof project through diametrically opposite slots 44 in the side wall 32b. The slots extend vertically, as illustrated in Figs. 5, 6 and 8, and permit the plunger 33 to move vertically to a limited extent relatively to the head member 32. A coil spring 45 serves to exert downward pressure upon the plunger. This spring is disposed in the upper portion of the side wall 32b and extends between the cross wall 32a and the upper end of the plunger. The lower end of the plunger projects beneath the head member 32. The blade 34 embodies a cutting edge 34a and is secured by a screw 46 to one end of a holder 47. The latter is in the form of a rectangular block of metal and is mounted slidably in a slideway 48 in the portion of the plunger which projects beneath the head member 32. The slideway 48 extends approximately at an angle of 45° with respect to the horizontal and permits the blade holder to be slid or shifted downwardly and outwardly for the purpose of effecting insertion of the blade into the patch-forming strip 11.

In the patch-cutting operation, the cutting head 25 is rotated and is shifted downwardly towards the strip 11. During downward shift of the head, the plunger 33 is arrested as it nears the strip by means of a pair of rollers 49. The latter are rotatably mounted on the ends of the transverse shaft 42 and coact with a circular track 50. This track is in the nature of a collar which extends around and forms a bearing for the lower end of the head member 32, and is connected by a screw thread connection 51 to a support 52 which is connected fixedly to and projects forwardly from the standard 14 of the supporting structure 12. When the cutting head 25 is lowered, the rollers 49 are brought into contact with and revolve around the circular track 50 and in conjunction with the transverse shaft 42, arrest the plunger 33. By virtue of the fact that the support 52 is connected to the track 50 by a screw thread connection, the track may be raised or lowered for adjustment purposes by rotating it relatively to the support. A set screw 53 serves to lock the track in place after it has been adjusted to the proper position. This set screw extends transversely through the support 52 and is arranged so that the inner end thereof engages or abuts against the track. The downward stroke or movement of the cutting head 25 is such that the head member 32 is moved downwardly a comparatively small distance after the plunger 33 is arrested by engagement of the rollers 49 with the circular track 50. The lower end of the cylindrical side wall 32b of the head member 32 is shaped or cut so that it embodies a conical surface 54. The upper end of the blade holder 47 projects beyond the slideway 48 and engages this conical surface. When the head member 32 is shifted downwardly relatively to the plunger 33, the surface 54 operates to shift the holder 47 downwardly and outwardly so as to effect penetration of the blade 34 in the patch-forming strip. By virtue of the fact that the cutting head 25 rotates during downward shift thereof, the blade 24 makes a circular incision in the strip and results in the formation of a truly circular tire patch with a bevelled edge. The blade holder 47 is retracted during the up stroke of the cutting head, by means of a coil spring 55. This spring has the ends thereof anchored to pins 56 at diametrically opposite portions of the lower end of the plunger 33, and is arranged so that the central portion thereof is connected to a hook on the lower end of the blade holder. The spring is under tension and operates, during upward movement of the head member 32 relatively to the plunger, to force the blade holder inwardly and upwardly.

To prevent distortion of the strip 11 during the patch-cutting operation, a disk or presser foot 57 is provided. This disk is located directly beneath the lower end of the plunger 33 and is supported by a vertically extending stem 58. The latter extends through a vertical bore 59 in the plunger and a vertical bore 60 in the stem 32c of the head member 32 and projects through the sleeve 31 into the upper end of the bore 40. A coil spring 61 surrounds the upper end of the stem 58 and extends between the upper end of the sleeve 31 and a collar 62 on the extreme upper end of the stem 58. This spring is under compression and serves to hold the disk 57 through the medium of the stem 58, in fixed relation with respect to the plunger 33. Balls 63 are retained in oppositely facing annular grooves in the lower end of the plunger 33 and the upper face of the disk 57, and serve as a bearing whereby the plunger is rotatable relatively to the disk. The edge or marginal portion of the disk is bevelled conformably to the angle at which the blade 34 extends. During the cutting operation, the disk is arranged so that it engages the top surface of the patch-forming strip 11 when the plunger 33 is arrested by the rollers 49 during the down stroke of the cutting head 25. Upon engagement of the disk with the strip, the disk holds the strip so that it is not distorted by the action of the blade 34. The disk is adapted to remain stationary while it is in engagement with the strip. The stem 58 extends through an opening 64 in the central portion of the shaft 42 and operates to hold the shaft against axial displacement. It also extends through a longitudinal slot 65 in the central portion of the blade holder 48. A ring 66 assists the disk 57 in holding the patch-forming strip against distortion during the patch-cutting operation. This ring 66 is carried by a vertically extending bar 67 and rests loosely upon the top face of the strip.

An electric motor 68 serves to drive the blade equipped cutting head 25. This motor is positioned behind the base 13 of the supporting structure 12 and is connected to drive a horizontally extending shaft 69 through the medium of an endless belt 70 and a pair of pulleys 71 and 72. The shaft 69 is located behind the worktable 15 and is journalled in a pair of bearings 73. The latter project rearwardly from and are formed integrally with the central portion of the standard 14. The pulley 71 is keyed or otherwise fixedly secured to one end of the armature shaft of the electric motor. The pulley 72 is mounted on and is connected to drive the shaft 69. The belt 70 extends around the pulleys 71 and 72 and operates, during operation of the electric motor, to drive the shaft 69. The cutting head 25 is driven from the shaft 69 by an endless belt 74. The latter extends around a pulley 75 on the shaft 69 and the pulley 37 at the upper end of the spindle 30. A pair of idler pulleys 76 and 77 take up the slack in the belt 74. The pulley 76 is applied to the central portion of one of the reaches of the belt and is carried by a bracket 78 which is adjustably mounted on a horizontally extending shaft 79. The latter is connected to and projects rearwardly from the upper end of the standard 14. The idler pulley 77 is applied to the central portion of the other reach of the belt 74 and is carried by a bracket 80 on the extreme outer end of the horizontally extending shaft 79. During operation of the electric motor 68, the horizontally extending shaft 69 is driven through the medium of the endless belt 70 and the pulleys 71 and 72, and drives the pulleys 37 at the upper end of the spindle 30 by way of the endless belt 74.

The cutting head 25 is raised and lowered by mechanism which is driven by the electric motor 68. This mechanism comprises a pulley 81 which is keyed or otherwise secured to the horizontally extending shaft 69 and drives an endless belt 82; a pulley 83 which is driven by the endless belt 82 and is loosely mounted on a horizontally extending shaft 84; a pair of clutch members 85 and 86 which are mounted on the shaft 84 and are adapted to be shifted into and out of interlocked relation; a pinion 87 which is fixed to the shaft 84 and meshes with a gear 88 on a horizontally extending shaft 89; a cam wheel 90 which is fixedly secured to one end of the shaft 89 and embodies a circular, eccentrically positioned cam groove 91; a vertically extending link 92 which is provided at its lower end with a roller 93 and is arranged so that the roller is disposed in the cam groove 91; and a two-piece rocker lever 94 which is fulcrumed on a pin 95 and is actuated by the link 92. The horizontally extending shaft 84 is located beneath the shaft 89 and is journalled in a pair of bearing brackets 96 which are secured to and project rearwardly from the lower end of the standard 14 of the supporting structure. The clutch member 85 is secured to and driven by the pulley 83, and is shiftable axially on the shaft 84 into interlocked relation with the clutch member 86. The latter is fixedly secured to the shaft 85 and is located adjacent to the pinion 87. The clutch member 85 is shifted by means of a foot pedal 97 which is pivoted to a bracket 98 on the base 13 and is connected to one end of a cable 99. The latter extends over a sheave 100 and is anchored to a rod 101 which extends horizontally, is slidably mounted in the bearing brackets 96 and embodies a laterally extending arm 102. The outer end of this arm fits against the pulley 83. When the foot pedal 97 is depressed, the cable 99 is pulled so that the rod 101 is shifted axially and causes the arm 102 to shift the clutch member 85 into interlocked relation with the clutch member 86. A coil spring 103 extends around the rod 101 and serves to shift the latter so as to disengage the clutch member 85 from the clutch member 86. The horizontally extending shaft 89 is journalled in the bearing brackets 96 and is located beneath the shaft 86. The two-piece rocker lever 94 comprises an elongated piece 94a and a socketed piece 94b. The fulcrum pin 95 extends through the central portion of the lever piece 94a and is carried by the arm 16. One end of the lever piece 94a is provided with a longitudinally extending open-ended slot 104 which receives a pin 105 on the spindle 30 and forms with the pin a connection whereby the cutting head 25 is raised and lowered during rocking of the lever 94. The other end of the lever piece 94a extends in the socket in the lever piece 94b and is connected pivotally in place by a pin 106. A pair of screws 107 lock the lever piece 94a against pivotal movement relatively to the lever piece 94b. These screws are carried by the lever piece 94b and are arranged so that they face one another. By adjusting the screws 107, the lever piece 94a may be adjusted with respect to the lever piece 94b so as to control the stroke of the cutting head 25. When the clutch members 85 and 86 are in interlocked relation and current is supplied to the electric motor 68, the link 92 operates in response to the action of the cam wheel 90 to rock the lever 94 vertically and to raise and lower the cutting head for patch cutting purposes. The upper end of the link 92 is connected pivotally to a stud 108 on the outer end of the lever piece 94b.

The feed rolls 23 and 24 are driven intermittently so as to effect a step-by-step feed of the patch-forming strip 11 across the worktable 15 by means of mechanism which is driven by the electric motor 68. This mechanism comprises a gear 109 which is mounted on a stud 110 on the standard 14 of the supporting structure and meshes with the gear 88; a link 111 which extends vertically and has the lower end thereof connected pivotally to an eccentric pin 112 on the gear 109; a vertically extending rod 113 which is slidable axially in bearing brackets 114 on the standard 14 and is connected pivotally to the upper end of the link 111; a horizontally extending arm 115 which is secured to and projects laterally from the slide rod 113; and an arm 116 which is loosely mounted on and projects radially from the shaft 26 of the feed roll 24 and embodies at the outer end thereof an elongated slot 117 through which extends the outer or distal end of the arm 115. The arm 116 is provided with a pawl 118 which meshes with a ratchet 119 on the shaft for the feed roller 24. When the gear 88 is driven by the electric motor 68, the slide rod 113 is reciprocated by the link 111 and operates through the medium of the arm 115 to swing the arm 116 up and down. When the arm 116 is swung downwardly, the pawl 118 engages the ratchet 119 and rotates the feed rolls 23 and 24. So as to feed the patch-forming strip 11 on the up stroke of the arm 116, the pawl 118 rides loosely on the ratchet 119 and imparts no movement to the feed rolls. The mechanism for raising and lowering the cutting head 25 is arranged or timed so that the head is lowered for patch-cutting purposes during the intervals at which the strip 11 is at rest on the worktable 15. As a result of this arrangement or timing, the step-by-step feed of the strip takes place during the up stroke of the cutting head and the strip is addressed during the cutting operation.

The operation of the apparatus is as follows:

When current is supplied to the electric motor 68 and the clutch-member 85 is interlocked with the clutch-member 86, the shaft 69 is driven through the medium of the endless belt 61 and the pulleys 71 and 72, and in turn drives the pulley 37 by way of the belt 74 and drives the shaft 84 by way of the endless belt 82. The pulley 37 which is splined to the upper end of the spindle 30 operates to drive the cutting head 25 so as to rotate the blade 34 at the lower end of the holder 37. The shaft 84 drives the mechanism for raising and lowering the cutting head. On the down stroke of the cutting head, the plunger 33 is arrested by the rollers 49 as the disk 57 engages the top face of the patch-forming strip 11. After the plunger is arrested, the head-member 32 of the cutting head is shifted downwardly a small distance and operates to move the holder 47 downwardly and outwardly so as to effect a gradual penetration or insertion of the knife 34 into the strip 11. As the blade 34 is rotated and fed progressively downwards, a circular incision or cut is made in the strip with the result that a tire patch with a bevelled edge is formed. During the up stroke of the cutting head, the blade 34 is retracted by the coil spring 55 and the feed rolls 23 are driven so as to shift the cut portion of the strip away from the head and bring the succeeding portion into position for cutting by the blade 34 on the subsequent down stroke of the cutting head.

The tire patches 10 are separated from the patch-forming strip 11 by a vertically extending plunger 120. The latter depends from an arm 121 which extends loosely around the spindle 30 and operates, in response to raising and lowering of the cutting head 25, to raise and lower the plunger 120. The plunger 120 is positioned above an opening 122 in the rectangular portion 15ª of the worktable 15, and operates, during the down stroke of the cutting head 25, to separate from the strip 11 the tire patch which was formed by the blade 23 on the preceding down stroke of the head. Upon separation from the strip 11, the tire patches 10 drop onto a chute 123 which is fixed to the under side of the worktable 15, and discharges into a hopper or container (not shown).

The herein described cutting apparatus consists of but a comparatively small number of parts and operates efficiently to cut composite, patch-forming strips into truly circular patches having bevelled edges. By virtue of the fact that the cutting of the strip is effected by a blade which is simultaneously rotated and fed progressively into the strip, the bevelled edges of the patches are even and the patches are symmetrical.

Whereas the apparatus has been defined as being adapted expressly or primarily for use in cutting tire patches from a composite strip of patch-forming material, it is to be understood that the apparatus may be used to cut other kinds of circular articles having bevelled edges. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. In an apparatus for cutting a circular, bevel-edged article from a strip, the combination of a supporting structure, a cutting head supported by said structure for rotation on a substantially vertical axis and comprising a blade mounted so that it is shiftable downwardly and outwardly, a table associated with the supporting structure and arranged to support the strip directly beneath the head, means for rotating the head so as to cause the blade to revolve in a circular path over the strip, and means operative during rotation of said head, for shifting the blade downwardly and outwardly so as to effect angular insertion thereof into the strip and thus cause cutting of the article from the strip as the head is rotated by the rotating means.

2. In an apparatus for cutting a circular, bevel-edged article from a strip, the combination of a supporting structure, a cutting head supported by said structure for rotation and vertical movement and comprising a blade mounted so that it is shiftable downwardly and outwardly, a table associated with the structure and arranged to support the strip directly beneath the head, means for rotating the head in order to cause the blade to revolve in a circular path over the strip, means for raising and lowering the head during rotation of the latter, and means operative during the down stroke of the head, for shifting the blade downwardly and outwardly so as to effect angular insertion thereof into the strip and thus cause cutting of the article from the strip as the head is rotated by the rotating means.

3. In an apparatus for cutting a circular, bevel-edged article from a strip, the combination of a supporting structure, a cutting head supported by said structure for rotation and vertical movement and comprising a freely rotatable strip-engaging element and a blade mounted so that it is shiftable downwardly and outwardly of the element, a table associated with the structure and arranged to support the strip directly beneath the head, means for rotating the head in order to cause the blade to swing in a circular path over the strip and around the element, means for shifting the head downwardly so as to bring the element into frictional engagement with the strip and then raising the head, and means operative during rotation of the head and after engagement of the element with the strip, for shifting the blade downwardly and outwardly so as to effect angular insertion thereof into the strip and thus cause cutting of the article from the strip as the head is rotated by the rotating means.

4. In an apparatus for cutting a circular, bevel-edged article from a strip, the combination of a supporting structure, a cutting head supported by said structure for rotation and vertical movement and comprising a hollow head-member, a vertical plunger having the upper end thereof movable vertically in the member and a blade mounted in the lower end of the plunger so that it is slidable downwardly and outwardly, a table associated with the structure and arranged to support the strip directly beneath the head, means for rotating the head in order to cause the blade to swing in a circular path over the strip, means for raising and lowering the head during rotation of the latter, means for arresting the plunger during the down stroke of the head and as it approaches the strip, and means on the head-member operative during the remainder of the down stroke of the head, for shifting the blade downwardly and outwardly.

5. In an apparatus for cutting a circular, bevel-edged article from a strip, the combination of a supporting structure, a cutting head supported by said structure for rotation and vertical movement and comprising a hollow head-member, a vertical plunger having the upper end thereof movable vertically in the member, an angular open-ended slideway in its lower end and a blade mounted in the slideway so that it is slidable downwardly and outwardly and having a piece at the rear end thereof projecting beyond the upper end of the slideway, a table associated with the structure and arranged to support the strip directly beneath the head, means for rotating the head in order to cause the blade to swing in a circular path over the strip, means for raising and lowering the head during rotation of the latter, means for arresting the plunger during the down stroke of the head and as it approaches the strip, and means operative during the remainder of the down stroke of the head and in conjunction with the end piece of the blade, for shifting the blade downwardly and outwardly so as to effect angular insertion thereof into the strip and thus cause cutting of the article from the strip as the head is rotated by the rotating means.

6. In an apparatus for cutting a circular, bevel-edged article from a strip, the combination of a supporting structure, a cutting head supported by said structure for rotation and vertical movement and comprising a hollow head-member, a vertical plunger having the upper end thereof movable vertically in the member, an angular open-ended slideway in its lower end and a blade mounted in the slideway so that it is slidable downwardly and outwardly and having a piece at the rear end thereof projecting beyond the upper end of the slideway, a table associated with the structure and arranged to support the strip directly beneath the head, means for rotating the head in order to cause the blade to swing in a circular path over the strip, means for raising and lowering the head during rotation of the latter, and means for arresting the plunger during the down stroke of the head and as it approaches the strip, the lower end of the head-member being shaped and arranged so that during the remainder of the down stroke of the head it engages the end piece of the blade and shifts the blade downwardly and outwardly so as to effect angular insertion thereof into the strip and thus cause cutting of the article from the strip as the head is rotated by the rotating means.

7. In an apparatus for cutting a circular, bevel-edged article from a strip, the combination of a supporting structure, a cutting head supported by said structure for rotation and vertical movement, a hollow head-member, a vertical plunger having the upper end thereof movable vertically in the member and a blade mounted in the lower end of the plunger so that it is slidable downwardly and outwardly, a table associated with the structure and arranged to support the strip directly beneath the head, means for rotating the head in order to cause the blade to revolve in a circular path over the strip, means for raising and lowering the head during rotation of the latter, means for arresting the plunger during the down stroke of the head and as it approaches the strip embodying a roller connected to one side of the plunger and a stationary, circular track directly beneath the roller and around which the roller travels after being brought into engagement therewith during the down stroke of the head, means operative after arrest of the plunger and during the remainder of the down stroke of the head, for shifting the blade downwardly and outwardly so as to effect angular insertion thereof into the strip and thus cause cutting of the article from the strip as the head is rotated by the rotating means.

8. In an apparatus for cutting a circular, bevel-edged article from a strip, the combination of a supporting structure, a cutting head supported by said structure for rotation and vertical movement, a hollow head-member, a vertical plunger having the upper end thereof movable vertically in the member and a blade mounted in the lower end of the plunger so that it is slidable downwardly and outwardly, a table associated with the structure and arranged to support the strip directly beneath the head, means for rotating the head in order to cause the blade to revolve in a circular path over the strip, means for raising and lowering the head during rotation of the latter, means for arresting the plunger during the down stroke of the head and as it approaches the strip embodying a shaft extending transversely through the upper end of the plunger and through aligned vertically extending slots in the head-member, rollers on the ends of the shaft and a stationary, circular track beneath the rollers around which the rollers travel after being brought into engagement therewith during the down stroke of the cutting head, and means operative after arrest of the plunger and during the remainder of the down stroke of the head, for shifting the blade downwardly and outwardly so as to effect angular insertion thereof into the strip and thus cause cutting of the article from the strip as the head is rotated by the rotating means.

9. In an apparatus for cutting a circular, bevel-edged article from a strip, the combination of a supporting structure, a cutting head supported by said structure for rotation and vertical movement, a hollow head-member, a vertical plunger having the upper end thereof movable vertically in the member and a blade mounted in the lower end of the plunger so that it is slidable downwardly and outwardly, a table associated with the structure and arranged to support the strip directly beneath the head, means for rotating the head in order to cause the blade to revolve in a circular path over the strip, means for raising and lowering the head during rotation of the latter, means for arresting the plunger during the down stroke of the head and as it approaches the strip embodying a shaft extending transversely through the upper end of the plunger and through aligned vertically extending slots in the head-member, rollers on the ends of the shaft and a vertically adjustable, circular track supported beneath the rollers and on the supporting structure and around which the rollers travel after being brought into engagement therewith during the down stroke of the cutting head, and means operative after arrest of the plunger and during the remainder of the down stroke of the head, for shifting the blade downwardly and outwardly so as to effect angular insertion thereof into the strip and thus cause cutting of the article from the strip as the head is rotated by the rotating means.

10. In an apparatus for cutting a circular, bevel-edged article from a strip, the combination of a supporting structure, a cutting head supported by said structure for rotation and vertical movement, a hollow head-member, a vertical plunger having the upper end thereof movable vertically in the member and a blade mounted in the lower end of the plunger so that it is slidable downwardly and outwardly, a table associated with the structure and arranged to support the strip directly beneath the head, means for rotating the head in order to cause the blade to revolve in a circular path over the strip, means for raising and lowering the head during rotation of the latter, means for arresting the plunger during the down stroke of the head and as it approaches the strip embodying a shaft extending transversely through the upper end of the plunger and through aligned vertically extending slots in the head-member, rollers on the ends of the shaft and a vertically adjustable, circular track extending loosely around the lower end of the head-member and arranged beneath the rollers and so that the latter are brought into engagement therewith and travel therearound during the down stroke of the head, and means operative after arrest of the plunger and during the remainder of the down stroke of the head, for shifting the blade downwardly and outwardly so as to effect angular insertion thereof into the strip and thus cause cutting of the article from the strip as the head is rotated by the rotating means.

11. A machine for cutting bevel-edged patches from cold patch material having an adhesive face, comprising a table, a presser-foot overlying said table and adapted to clamp a section of material against said table with the adhesive face side down, an outwardly and downwardly inclined knife mounted above said presser-foot to move in a closed path encircling said presser-foot, means for moving said cutting edge along said closed path, and means for simultaneously advancing said cutting edge outwardly and downwardly in the direction of its incline progressively through the body of said material and said adhesive face in order to produce a feather edge on said cut section closely adherent to the edges of the severed section of the adhesive face.

12. In a machine of the class described, the combination of a table, means for intermittently feeding composite sheet material across said table, means for clamping a circular section of the material against said table in the intervals between feeding thereof, cutting means supported above said clamping means comprising an outwardly inclined cutting edge, means for moving said cutting means in a circular path about said clamping means, and means for forcing said cutting means downwardly and outwardly to sever said clamped section of material from said sheet producing thereon an outwardly beveled edge.

13. In a machine of the class described, the combination of a cutting head having a plunger adapted to rotate therewith and move longitudinally with respect thereto, resilient means interposed between said plunger and head for urging said plunger to extended position with respect to said head, a presser-foot carried at the lower end of said plunger and rotatable relative thereto, a cutting member carried by said plunger in position for projection downwardly and outwardly past the edge of said presser-foot and normally occupying a retracted position, and means on said head for projecting said cutting member upon relative longitudinal movement of said plunger and head from the extended position thereof, substantially as and for the purpose described.

14. A cutting head comprising a vertical plunger having a downwardly inclined passage extending transversely across the axis thereof, a cutting tool slidably mounted in said passage, and means adapted to act on the upper end of said cutting tool at one side of said axis to project the cutting end of said tool at the opposite side of said axis, substantially as and for the purpose described.

15. In a machine of the class described, the combination of a table, means for intermittently feeding composite sheet material across said table, means for smoothing said material adjacent a portion of the table where cutting is to be effected, cutting and clamping means comprising a rotating and vertically moving plunger supported above said portion of the table, a presser-foot carried by said plunger and rotatable with respect thereto to cease rotation when lowered against said material, an outwardly and downwardly inclined cutting tool carried by said plunger and moved thereby in a path encircling said presser foot, means for advancing said tool downwardly and outwardly into the material as said foot is pressed thereagainst, means for lowering and raising said plunger, and means operated as said plunger is lowered in the intervals between feeding of the material for ejecting previously severed portions from the main body of said material.

PAUL VAN CLEEF.